United States Patent [19]

Wilwerding

[11] 3,980,924

[45] Sept. 14, 1976

[54] REMOTE LIGHT SENSOR FOR ELECTRONIC FLASH UNITS

[75] Inventor: Dennis J. Wilwerding, Littleton, Colo.

[73] Assignee: Honeywell Inc., Minneapolis, Minn.

[22] Filed: Dec. 19, 1975

[21] Appl. No.: 642,282

[52] U.S. Cl. .......................... 315/241 P; 315/151; 315/159

[51] Int. Cl.$^2$ ...................... H05B 41/32; G01J 1/16

[58] Field of Search ........... 315/241 R, 241 P, 151, 315/159; 250/214 P; 354/145

[56] References Cited

UNITED STATES PATENTS

| | | | |
|---|---|---|---|
| 3,758,817 | 9/1973 | Elliott | 315/241 R |
| 3,758,822 | 9/1973 | Wilwerding | 315/241 P |
| 3,774,072 | 11/1973 | Ogawa | 315/151 |
| 3,809,951 | 5/1974 | Vital et al. | 315/151 X |
| 3,878,429 | 4/1975 | Iwata | 315/151 |
| 3,914,647 | 10/1975 | Broekstra et al. | 315/241 P |

*Primary Examiner*—Eugene La Roche
*Attorney, Agent, or Firm*—David R. Fairbairn

[57] ABSTRACT

An improved remote light sensor for use with an electronic flash unit is disclosed. The remote light sensor generates a termination signal to terinate the light provided by the flash unit when sufficient light is received from the scene being illuminated.

27 Claims, 2 Drawing Figures

REMOTE LIGHT SENSOR FOR ELECTRONIC FLASH UNITS

REFERENCE TO CO-PENDING APPLICATIONS

Subject matter disclosed but not claimed in this application is disclosed and claimed in co-pending applications by Dennis J. Wilwerding, entitled "Extended Range Correct Exposure Annunciator", Ser. No. 642,281, and by John D. Dick and Dennis J. Wilwerding, entitled "Automatic Exposure Indicator", Ser. No. 642,283, which were filed on even data herewith and assigned to the same assignee.

BACKGROUND OF THE INVENTION

The present invention relates to automatic electronic or "computer" flash systems. In particular, the present invention relates to an improved light sensing device for use with automatic electronic flash systems.

Automatic electronic flash systems include a light producing means, generally a flash tube, which is actuated to illuminate a scene being photographed. A light sensing means detects the scene illumination and produces a light termination or "quench" signal when sufficient light has been produced to properly expose a light sensitive film of an associated camera. The light termination signal actuates a light terminating means which terminates the light flash.

One advantageous flash system utilizes a remote light sensing means or "remote sensor" which is connected to the electronic flash unit by a two-wire cord or cable. Systems of this type are described in U.S. Pat. Nos. 3,714,443 by F. T. Ogawa; 3,737,721 by F. T. Ogawa; 3,793,556 by D. J. Wilwerding; 3,758,822 by D. J. Wilwerding; and 3,914,647 by B. Broekstra and D. J. Wilwerding. While these remote sensors have been generally satisfactory, there has still existed a need for an improved remote sensor which provides a light termination signal even more accurately and reliably and with fewer components than the prior art devices.

In particular, the prior art devices have had some shortcomings. First, in the prior art devices, the termination signal could be, in the worst case, only approximately a five volt level shift. As a result, a very sensitive sensing circuit in the flash unit is required to sense the termination signal. This results in noise sensitivity problems, problems with the maximum number of flash units which can be connected to a single sensing means, problems with maximum shutter cord length, and generally constrained operational requirements.

Second, the prior art devices are susceptible to rate firing of the light activated silicon controlled rectifier (LASCR) when the signal line potential is being established. Since the LASCR has already fired, the light sensing means does not provide the light termination signal when the desired amount of light has been received. Overexposure of the subject, therefore, can result.

Third, when the flash unit includes a correct exposure annunciator, additional circuitry has been required in the remote sensor to eliminate the generation of false termination signals which improperly operate the correct exposure annunciator. The additional components increase the cost of the remote sensor.

SUMMARY OF THE INVENTION

The light sensing means of the present invention includes first and second terminals for receiving, respectively, a reference potential and a signal line potential, first control signal generating means, switching means, and biasing means. The signal line potential exhibits a first change with respect to the reference potential when the electronic flash unit is selectively rendered operative. The switching means provides a second change in the signal line potential with respect to the reference potential when a first control signal attains a predetermined value. The first control signal generating means provides this first control signal in response to light received. The biasing means provides a bias signal which is opposite to the first control signal. The bias signal prevents premature actuation of the switching means.

DETAILED DESCRIPTION OF THE PREFERRED EMBODIMENTS

Figure 1:
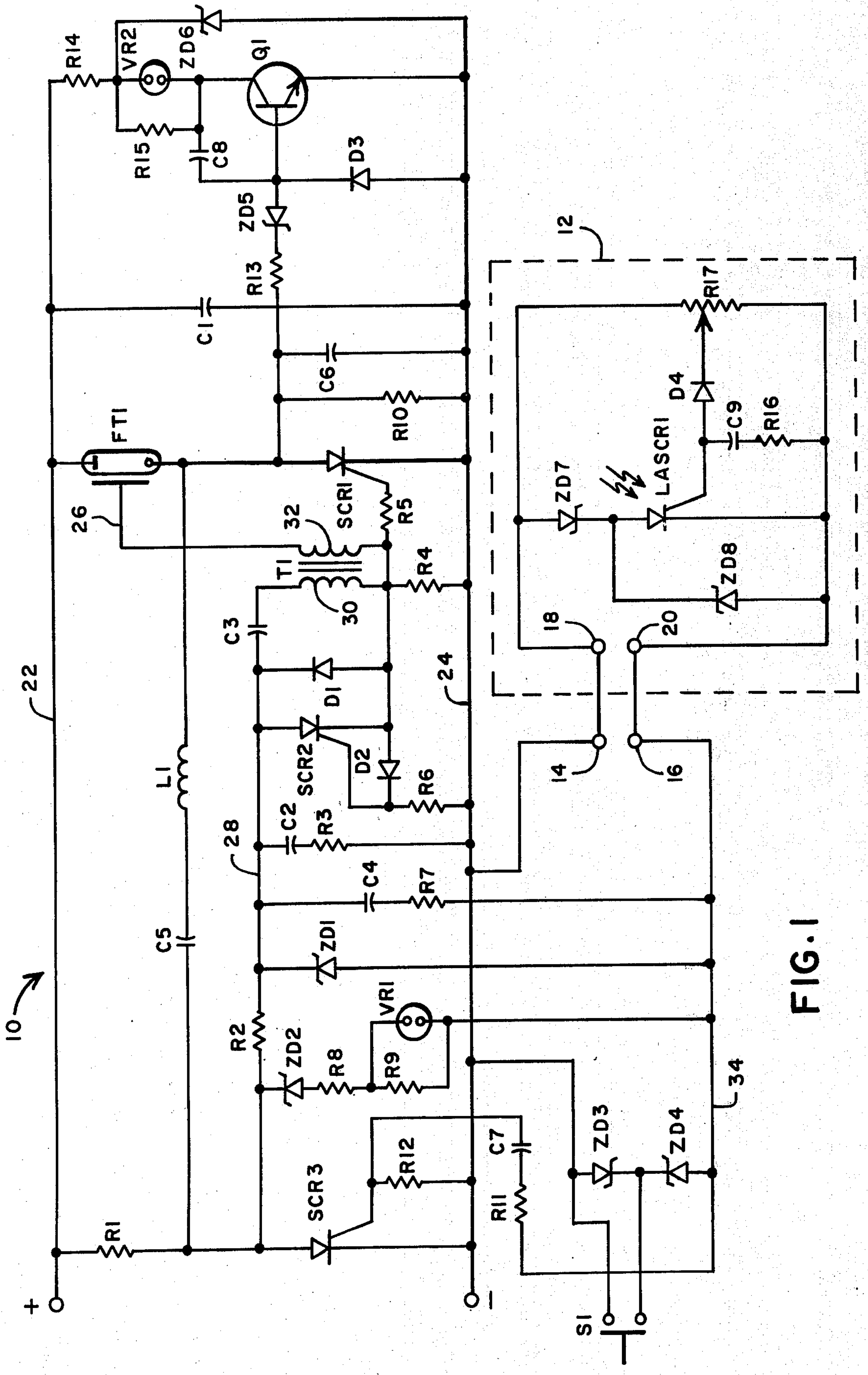
FIG. 1 schematically shows an electronic flash unit and the remote sensor of the present invention.

FIG. 1 shows an electronic flash system including an electronic flash unit 10 and a remote light sensor 12. Terminals 14 and 16 of flash unit 10 are connected to terminals 18 and 20 of remote sensor 12, respectively, by a two-wire cord or cable.

Electronic flash unit 10 includes conductors 22 and 24. Conductor 22 is connected to a positive terminal, and conductor 24 is connected to a negative terminal. The positive and negative terminals are connected to the usual capacitor charging means (not shown but well known in the art).

Main flash storage capacitor C1 is connected between conductors 22 and 24. Also connected between conductors 22 and 24 is the series connection of flash tube FT1 and flash termination switch SCR1. As shown in FIG. 1, flash termination switch SCR1 may be a semiconductor switching device such as a silicon controlled rectifier. The anode of flash tube FT1 is connected to conductor 22 and the cathode of FT1 is connected to the anode of SCR1. The cathode of SCR1 is connected to conductor 24.

In order to initiate a light flash, an ignition signal must be applied to triggering terminal 26 of flash tube FT1. In addition, SCR1 must be turned on at the same time by a signal to the gate of SCR1. These signals are produced by the circuits which include resistors R1 through R9, capacitors C1 through C4, diodes D1 and D2, transformer T1, triggering switch SCR2, zener diodes ZD1 through ZD4, indicator lamp VR1, and contact S1.

Resistors R1, R2, and R3 and capacitor C2 form a series circuit between conductors 22 and 24. Resistor R1 has one terminal connected to conductor 22 and the other terminal connected to a terminal of resistor R2. The opposite terminal of resistor R2 is connected to conductor 28. Capacitor C2 and resistor R3 are connected in series between conductor 28 and conductor 24.

Capacitor C3 has one terminal connected to conductor 28 and the opposite terminal connected to a terminal of the primary winding 30 of transformer T1. The other terminal of primary winding 30 is connected to resistor R4, which is connected between primary winding 30 and conductor 24.

The secondary winding 32 of transformer T1 has one terminal connected to the junction of primary winding 30 and resistor R4, and the opposite terminal connected to flash triggering terminal 26. Resistor R5 is connected between the common terminal of the transformer windings and the gate of SCR1.

Flash trigger switch SCR2 has its anode connected to conductor 28 and its cathode to the common terminal of the transformer windings. The gate of SCR2 is connected through resistor R6 to terminal 24.

Diode D1 is connected in parallel with the anode-cathode current path of SCR2. The anode of diode D1 is connected to the cathode of SCR2, and the cathode of D1 is connected to the anode of SCR2. Diode D2 is connected between the cathode and gate of SCR2. The anode of D2 is connected to the cathode of SCR2, and the cathode of D2 is connected to the gate of SCR2.

Zener diode ZD1 is connected between conductor 28 and signal line conductor 34. The anode of ZD1 is connected to signal line 34, and the cathode of ZD1 is connected to conductor 28. Also connected between conductor 28 and signal line 34 is the series circuit formed by capacitor C4 and resistor R7.

Signal line 34 is connected to terminal 16, and conductor 24 is connected to terminal 14. The potential on line 24 and, therefore, at terminal 14 may be termed the "reference potential". The potential on signal line 34 and, therefore, terminal 16 may be termed the "signal line potential".

A circuit formed by zener diode ZD2, resistors R8 and R9, and indicator lamp VR1 is connected between the junction of resistors R1 and R2 and signal line 34. The cathode of ZD2 is connected to the junction of R1 and R2, and the anode of ZD2 is connected to one terminal of resistor R8. The other terminal of R8 is connected to one terminal of indicator lamp VR1. The opposite terminal of indicator lamp VR1 is connected to signal line 34. Resistor R9 is connected in parallel with VR1.

Zener diodes ZD3 and ZD4 are connected in series between reference conductor 24 and signal line 34. The anode of ZD3 is connected to reference conductor 24, and the cathode of ZD3 is connected to the cathode of ZD4. The anode of ZD4 is connected to signal line 34. Flash contacts S1 are connected in parallel to zener diode ZD3.

The light flash may be terminated by a commutation circuit formed by capacitors C5, C6, C7, resistors R10, R11, and R12, inductor L1, and commutation switch SCR3. The anode of commutation switch SCR3 is connected to the junction of resistors R1 and R2, and the cathode of SCR3 is connected to conductor 24.

A series circuit formed by commutation capacitor C5 and inductor L1 is connected between the anode of commutation switch SCR3 and the anode of flash termination switch SCR1. Resistor R10 and capacitor C6 are both connected in parallel with the anode-to-cathode current path of termination switch SCR1.

The gate of commutation switch SCR3 is connected through capacitor C7 and resistor R11 to signal line 34. Resistor R12 is connected between the gate of SCR3 and reference conductor 24.

Flash unit 10 also includes a correct exposure annunciator. The correct exposure annunciator includes resistors R13, R14, and R15, zener diodes ZD5 and ZD6, transistor Q1, capacitor C8, diode D3, and indicator lamp VR2.

The base of transistor Q1 is connected to the anode of termination switch SCR1 through resistor R13 and zener diode ZD5. Resistor R14, indicator lamp VR2, and the collector-emitter path of Q1 form a series current path between conductors 22 and 24. Zener diode ZD6 is connected in parallel with VR2 and the collector-emitter path of Q1. The anode of ZD6 is connected to conductor 24, and the cathode of ZD6 is connected to the juncntion of VR2 and resistor R14.

Resistor R15 is connected in parallel with VR2. Miller capacitor C8 is connected between the base and collector of transistor Q1. Protective diode D3 is connected between base and emitter of Q1, with the anode of D3 connected to the emitter of Q1 and the cathode of D3 connected to the base of Q1.

The remote sensor 12 of the present invention includes terminals 18 and 20, zener diodes ZD7 and ZD8, a light activated silicon controlled rectifier, LASCR1, integration capacitor C9, anticipation resistor R16, diode D4, and potentiometer R17. Terminal 18 receives the reference potential, and terminal 20 receives the signal line potential.

Zener diodes ZD7 and ZD8 are connected in series between terminals 18 and 20. The anode of ZD7 is connected to terminal 18, and the cathode of ZD7 is connected to the cathode of ZD8. The anode of ZD8 is connected to terminal 20. Zener diode ZD7 is a first potential limiting means which limits the signal line potential to a first level prior to the first change in potential which occurs when the flash unit is rendered operative. Zener diode ZD8 is a second potential limiting means which limits the signal line potential to a second level after the first change. In the circuit shown in FIG. 1, the first voltage level is positive and the second voltage level is negative.

LASCR1, which acts as a switching means, is connected in parallel with ZD8. The anode of LASCR1 is connected to the cathodes of ZD8 and ZD7, and the cathode of LASCR1 is connected to terminal 20. LASCR1 provides a second change in the signal line potential when a first control signal (the voltage at the gate of LASCR1) attains a predetermined value. This predetermined value is when the gate voltage exceeds the cathode voltage.

Integration capacitor C9 and anticipation resistor R16 are connected in series between the gate of LASCR1 and terminal 20. Together with the photosensitive junction of LASCR1, integration capacitor C9 and anticipation resistor R16 form a first control signal generating means which provides the first control signal in response to light received. The light sensitive junction of LASCR1 is a light responsive means which produces a signal in response to light received. Integration capacitor C9 provides a light integral signal which forms part of the first control signal. The anticipation voltage across anticipation resistor R16 also forms part of the first control signal. In some other embodiments, anticipation resistor R16 may be omitted, in which case the light integral voltage is the first control signal.

Also connected to the gate of LASCR1 and to integration capacitor C9 is the anode of diode D4. The cathode of D4 is connected to the wiper arm of potentiometer R17. R16 is connected between terminals 18 and 20 to form a variable voltage divider. Diode D5 and potentiometer R17 form biasing means which provide a bias signal opposite to the first control signal to prevent premature actuation of LASCR1. This bias signal is in the form of a bias voltage on integration capacitor C9.

The operation of the flash system is generally as follows: Initially, main storage capacitor C1 is charged to a relatively high voltage (generally about 360 volts) by the usual capacitor charging means (not shown). Commutation capacitor C5 charges to the voltage on C1 through the charging circuit formed by resistors R1 and R10, and inductor L2.

With commutation capacitor C5 charged, capacitor C4 charges to a voltage determined by the zener voltage of ZD1. Capacitors C2 and C3 charge to a voltage limited by ZD1 and ZD3 or ZD7, depending on whether the zener voltage of ZD3 is less than or greater than the zener voltage of ZD7. In the preferred embodiments, the zener voltage of ZD3 exceeds the zener voltage of ZD7, and the zener voltage of ZD4 exceeds the zener voltage of ZD8. ZD7 and ZD8, therefore, limit the voltage levels of the signal line potential when remote sensor 12 is connected. Capacitor C7 is charged to a voltage equal to the zener voltage of ZD7 plus the forward voltage drop of ZD8.

Voltage indicator VR1 turns on when the voltage divider formed by ZD2, R8, and R9 senses that the voltage level of C5 has exceeded a predetermined value. The light emitted by indicator VR1 indicates that the apparatus is ready for operation.

At this time, the signal line potential at terminal 20 of remote sensor 12 is at a first voltage level which is positive with respect to the reference potential at terminal 18. The voltage difference between the two terminals is regulated by zener diode ZD7 due to current flow from the signal line through the forward biased zener diode ZD8 and the reversed biased zener diode ZD7. This establishes a first voltage level across terminals 18 and 20. This first voltage level is equal to the forward voltage drop across ZD8 plus the zener voltage of ZD7.

Potentiometer R17 divides this voltage and establishes a voltage at its wiper which is diode coupled by D4 to the gate of LASCR1. By this means, integration capacitor C9 is precharged by current flow from terminal 20 through R16, C9, D4, and a portion of R17 to terminal 18. Capacitor C9 is charged such that the gate of LASCR1 is negative with respect to the signal line potential at terminal 20. This voltage on C9 may be termed a "bias signal" which is opposite to the first control signal (the light integral voltage plus the anticipation voltage). LASCR1, therefore, is held in an "off" or non-conductive state. As a result of the bias signal, remote sensor 20 is prevented from prematurely actuating commutation switch SCR3 due to extraneous causes.

To initiate a flash, contacts S1 are closed. The closing of contacts S1 shorts ZD3 and drops the signal line potential from the first voltage level to approximately the reference potential. Capacitor C3 discharges through ZD1, ZD4, S1, R6, SCR2 gate-to-cathode, and the primary winding of T1 to capacitor C3. The time required to turn on SCR2 is rather short and, therefore, C3 does not dissipate much energy until SCR2 turns on. At that time, C3 dumps its charge through SCR2 anode-to-cathode and into the primary winding of T1. The voltage induced in the secondary winding of T1 is applied to triggering electrode 26 of FT1 to turn FT1 on.

With SCR2 on, a discharge path is established for charge stored on capacitor C2, it discharges through a current path including SCR2 anode-to-cathode, R5, SCR1 gate-to-cathode, and resistor R3. The time constant of C2 and R3 is selected so that the gate current is maintained on SCR1 until sufficient current is available through flash tube FT1 to keep SCR1 in conduction.

When SCR2 turns on, the potential at conductor 28 is reduced. This causes capacitor C4 to drive signal line 34 negative to a second voltage level determined by zener diode ZD8. The time constant of C4 and R7 allows C4 to maintain the second voltage level and thereby power the remote sensor until the flash is completed. The change in the signal line potential from the first level to the second level is referred to as the "first change".

The bias signal on capacitor C9 prevents false triggering of LASCR1 during the time when the signal line potential is being driven negative. The negative voltage on capacitor C9 maintains a negative gate-to-cathode potential on LASCR1 during this time period.

When a negative potential of the second level is established at terminal 20, an enabling signal voltage is established at the anode of LASCR1 which is equal to the zener voltage of ZD8 and which is positive with respect to the cathode of LASCR1. The enabling signal voltage effectively powers or enables LASCR1. That is, the potential difference appearing across LASCR1 anode-to-cathode is of such a magnitude to enable LASCR1 to become conductive upon receipt of a subsequent triggering signal at its gate.

When LASCR1 is enabled, its light sensitive junction receives light and produces a current representative of the amount of light received. This current flows through the gate of LASCR1 to integrating capacitor C9 and through anticipation resistor R16. This current charges capacitor C9 in a direction opposite to the bias signal. When the first control signal (i.e. the voltage at the gate of LASCR1) exceeds the voltage at the cathode of LASCR1 by an amount sufficient to forward bias the gate-cathode junction, LASCR1 becomes conductive.

When LASCR1 becomes conductive, it essentially shorts out zener diode ZD8. The signal line potential, therefore, exhibits a second change to a third level which is nearly that of the reference potential. This positive step change is coupled through resistor R11 and capacitor C7 to the gate of commutation switch SCR3. The positive going voltage on the gate of SCR3 turns SCR3 on.

When commutation switch SCR3 is turned on, commutation capacitor C5 is charged in an opposite direction through SCR3 anode-to-cathode, C1, FT1, and L1. This causes a reduction in voltage at the anode of SCR1 and turns off SCR1, thereby terminating the flash.

The correct exposure annunciator circuit operates as a result of commutation. Prior to commutation, C8 is charged positive through a current path including R14, R15, ZD5, R13, and R10. Q1 is turned off by virtue of no base current. Indicator VR2, therefore, is turned off.

Q1 is turned on and VR2 is ignited by the large positive voltage that is impressed at the anode of SCR1 after commutation. This voltage exists because after SCR2 turns off, current continues to flow through FT1 into capacitor C5 until FT1 extinguishes. This current is coupled through R13 and ZD5 and is of sufficient magnitude and duration to discharge capacitor C8 and turn transistor Q1 on.

As Q1 turns on, VR2 ignites, thereby indicating that commutation has occurred. The voltage at the collector of transistor Q1 then begins to rise due to the Miller coupling of C8. Indicator lamp VR2 extinguishes when the voltage across the collector-emitter of Q1 plus the maintaining voltage of VR2 equals the zener voltage of ZD6. The time for which VR2 stays ignited is determined by the values of C8, R14, and the gain of transistor Q1. Further description of the correct exposure annunciator circuit is contained in the above-mentioned co-pending application by J. D. Dick and D. J. Wilwerding.

The remote sensor 12 of FIG. 1 overcomes the shortcomings of the prior art remote sensors. Unlike the prior art sensors, the sensor of the present invention allows the cathode of LASCR1 to be directly connected to the signal line. This allows the termination or quench signal to swing the full signal line voltage with a much lower equivalent series resistance between terminals 18 and 20 when LASCR1 is conductive.

Second, LASCR1 is not susceptible to rate firing during the time when the signal line potential is being driven negative. The bias signal on capacitor C9 precludes LASCR1 from becoming forward biased gate-to-cathode as the signal line potential is being driven negative.

Third, in the event that an insufficient amount of light is received to cause LASCR1 to fire before FT1 extinguishes due to reduction in charge on C1, the possibility of false firing of LASCR1 is eliminated. In the past, false termination signals could occur when the signal line potential began to rise after FT1 had extinguished. This false firing was due to variations in signal line voltage which forward biased LASCR1. With the present invention, LASCR1 cannot become forward biased gate-to-cathode due to variations in signal line voltage if insufficient light has been received.

Fourth, the present invention uses far fewer components than were required with the prior art remote sensors. This reduces cost of the remote sensor in addition to providing improved performance.

Figure 2:
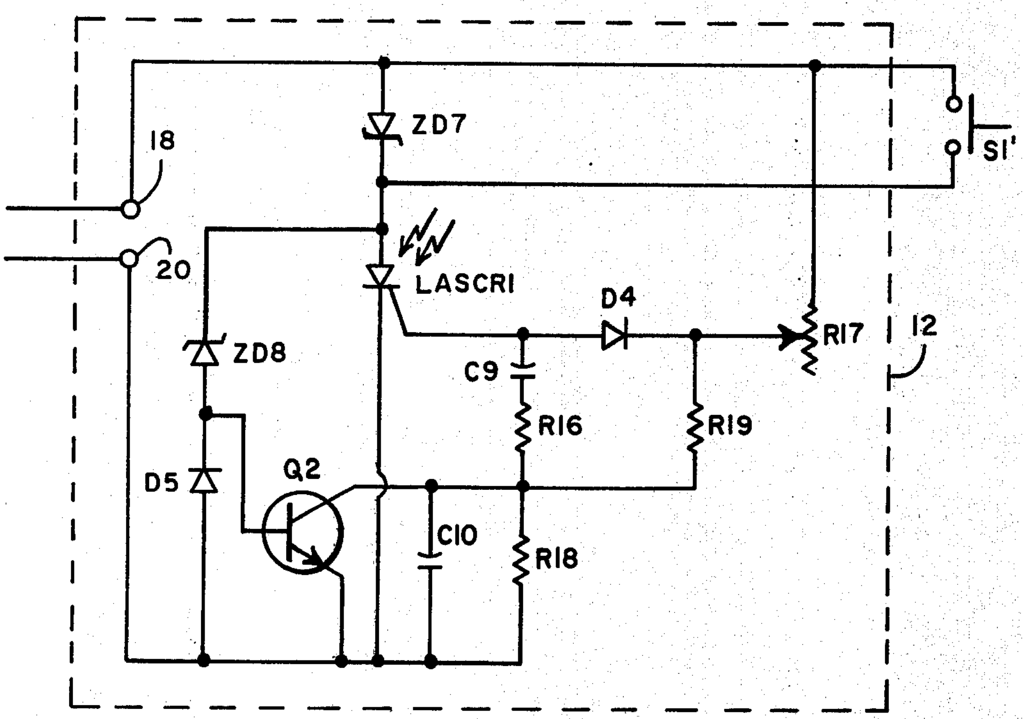
FIG. 2 schematically shows another preferred embodiment of the remote sensor of the present invention.

FIG. 2 shows another embodiment of the remote sensor of the present invention. This remote sensor is generally similar to the remote sensor shown in FIG. 1, and similar letters and numerals have been used to designate similar elements. Further description of the remote sensor of FIG. 2 is contained in the above-mentioned co-pending application by D. J. Wilwerding.

The additional components in FIG. 2 are diode D5, transistor Q2, capacitor C10, resistors R18 and R19, and flash contacts S1'.

Flash contacts S1' are connected across zener diode ZD7. This arrangement is an alternative to or may be in addition to flash contacts S1 shown in FIG. 1.

The other additional components provide an extended range of operational of the correct exposure annunciator. In the systems shown in FIG. 1, the correct exposure annunciator will only indicate correct exposure if commutation occurs. Commutation will only occur if the remote sensor receives a predetermined amount of light ("full rated illumination") and LASCR1 is fired. If the remote sensor receives only slightly less light than is required to fire LASCR1, there is no indication of a correct exposure. In fact, however, acceptable photographs can still be obtained down to one f/stop below the "full rated illumination".

The remote sensor shown in FIG. 2 overcomes this difficulty by providing a control signal to the correct exposure annunciator if the total amount of light received is within a certain percentage of the full rated illumination. This additional capability is provided by the circuit including diode D5, transistor Q2, capacitor C10, and resistors R18 and R19.

Diode D5 has its anode connected to terminal 20 and its cathode connected to the anode of zener diode ZD8. Resistor R18 is connected between terminal 20 and anticipation resistor R16. Resistor R19 is connected between the junction of R16 and R18 and the wiper of potentiometer R17. Capacitor C10 is connected in parallel with resistor R18, as is the collector-emitter current path of transistor Q2. The base of Q2 is connected to the cathode of diode D5.

The operation of the remote sensor is substantially the same as the operation of the remote sensor in FIG. 1. The closing of contacts S1' initiates the flash and results in the signal line potential of terminal 20 being driven negative to the second level, which is determined essentially by the zener voltage of ZD8.

When the signal line potential is at the second level, transistor Q1 is turned on. As a result, Q1 essentially shorts out resistor R18.

If flash tube FT1 extinguishes because the voltage on capacitor C1 can no longer maintain conduction (i.e. a "full light flash"), the signal line potential begins to rise toward the reference potential. Q1 turns off and the voltage at the collector of Q2 rises to a voltage determined by the voltage divider formed by resistors R18 and R19. This effectively adds an additional voltage to the first control signal (i.e. the gate voltage of LASCR1). If the new first control signal (equal to the light integral voltage plus the anticipation voltage plus the added voltage across R18) exceeds the cathode potential, LASCR1 fires. This results in a second change in the signal line potential toward the reference potential. This second change causes commutation to occur, which, in turn, results in a correct exposure indication from the correct exposure annunciator.

In conclusion, the present invention is an improved remote sensor for use with electronic flash units. The remote sensor of the present invention overcomes a number of disadvantages and shortcomings of the prior art remote sensors and provides generally improved performance. In addition, the remote sensor requires fewer components than were required with the prior art remotes sensors.

Although the present invention has been described with reference to a series of preferred embodiments, workers skilled in the art will recognize that changes may be made without departing from the spirit and scope of the invention. For example, the particular electronic flash unit shown in FIG. 1 is one unit which may be used with the remote sensor of the present invention. The remote sensor of the present invention, however, may be used with many different electronic flash units and many different correct exposure annunciators.

The embodiments of the invention in which an exclusive property or right is claimed are defined as follows:

1. For use with an electronic flash unit, a light sensing means comprising:

first and second terminals for receiving a reference potential and a signal line potential, respectively, the signal line potential exhibiting a first change with respect to the reference potential when the electronic flash unit is selectively rendered operative;

first control signal generating means for providing a first control signal in response to light received;

switching means having a control electrode, the switching means for providing a second change in the signal line potential with respect to the reference potential when the first control signal attains a predetermined value; and biasing means connected to the control electrode for providing a bias signal to prevent the first control signal from attaining the predetermined value until after the first change.

2. The invention of claim 1 wherein the first change in signal line potential with respect to the reference potential is from a first level to a second level.

3. The invention of claim 2 wherein the first and second levels are of opposite polarity.

4. The invention of claim 2 wherein the second change in the siganl line potential with respect to the reference potential is from the second level to a third level.

5. The invention of claim 2 wherein the switching means has a control electrode and first and second main current carrying electrodes.

6. The invention of claim 5 and further comprising:

enabling means for establishing an enabling potential means for establishing an enabling potential at the first main current carrying electrode when the signal line potential is at the second level.

7. The invention of claim 5 wherein the first control signal generating means comprises:

light responsive means for producing a signal in response to light received thereby; and integrating means for providing a light integral signal which forms at least a part of the first control signal.

8. The invention of claim 7 wherein the first control signal generating means further comprises:

anticipation means for providing an anticipation signal which forms a part of the first control signal.

9. The invention of claim 7 wherein the control electrode is connected to the integrating means and the second main current carrying electrode is connected to the second terminal.

10. The invention of claim 7 wherein the biasing means comprises:

voltage divider means connected between the first and second terminal; and diode means connected between the voltage divider means and the integrating means.

11. The invention of claim 2 and further comprising:

first potential limiting means for limiting the signal line potential to the first level prior to the first change.

12. The invention of claim 11 and further comprising:

second potential limiting means for limiting the signal line potential to the second level after the first change.

13. The invention of claim 12 wherein the switching means has a control electrode and first and second main current carrying electrodes.

14. The invention of claim 13 wherein the first potential limiting means is connected between the first terminal and the first main current carrying electrode.

15. The invention of claim 14 wherein the second potential limiting means is connected between the first main current carrying electrode and the second terminal.

16. The invention of claim 15 wherein the first and second potential limiting means establish an enabling potential at the first main current carrying electrode when the signal line potenetial is at the second level.

17. For use with an electronic flash unit, a light sensing means comprising:

first and second terminals for receiving a reference potential and a signal line potential, respectively, the signal line potential exhibiting a first change with respect to the reference potential when the electronic flash unit is selectively rendered operative;

light responsice means for producing a signal in response to light received thereby, integrating means connected to the light responsive means for providing a light integral signal which forms at least a part of a first control signal;

switching means having a control electrode connected to the integrating means for providing a second change in the signal line potential with respect to the reference potential when the first control signal at the control electrode attains a predetermined value; and biasing means connected to the control electrode for preventing the switching means from providing the second change until the signal line potential attains a predetermined level following the first change.

18. The invention of claim 17 wherein the biasing means biases the integrating means whereby the first control signal is insufficient to cause the switching means to provide a change until after the signal line potential attains a predetermined level following the flash initiated change.

19. The invention of claim 17 wherein the switching means is a silicon controlled rectifier having anode and cathode electrodes and having a gate electrode as the control electrode.

20. The invention of claim 19 wherein the cathode of the silicon controlled rectifier is connected to the second terminal.

21. The invention of claim 20 wherein the silicon controlled rectifier is a light activated silicon controlled rectifier (LASCR) and wherein the light responsive means is a light responsive junction of the LASCR.

22. The invention of claim 21 wherein the integrating means is connected between the gate of the LASCR and the second terminal.

23. The invention of claim 22 wherein the biasing means comprises:

voltage divider means connected between the first and second terminal, and diode means having an anode connected to the gate of the LASCR and a cathode connected to the voltage divider means.

24. The invention of claim 22 and further comprising:

first zener diode means having an anode connected to the first terminal and a cathode connected to the anode of the LASCR; and second zener diode means having an anode connected to the second terminal and a cathode connected to the anode of the LASCR.

25. The invention of claim 24 and further comprising contact means connected in parallel with the first zener diode means.

26. For use with an electronic flash unit, a light sensing means comprising:

first and second terminals for receiving a reference potential and a signal line potential, respectively, the signal line potential exhibiting a first change with respect to the reference potential when the electronic flash unit is selectively rendered operative;

light responsive means for producing a signal in response to light received thereby, integrating means connected to the light responsive means for providing a light integral signal;

switching means having a control electrode and first and second main current carrying electrodes, the second main current carrying electrode being connected to the second terminal, and the control electrode being connected to the integrating means;

first and second potential limiting means for limiting the signal line potential to a first level prior to the first change and a second level of opposite polarity after the first change, the first potential limiting means being connected between the first terminal and the first main current carrying electrode, and the second potential limiting means being connected between the first main current carrying electrode and the second terminal; and biasing means for biasing the control electrode to prevent the switching means from providing a second change in signal line potential with respect to the reference potential until the signal line potential attains the second level.

27. The invention of claim 26 wherein the biasing means comprises:

voltage divider means connected between the first and second terminal; and diode means connected between the voltage divider means and the control electrode.

* * * * *